United States Patent [19]

Strait

[11] Patent Number: 5,588,335
[45] Date of Patent: Dec. 31, 1996

[54] TORSION LOCK PARKING BRAKE ACTUATOR WITH PUSH DOWN RELEASE

[76] Inventor: Daniel L. Strait, 11856 Silver Creek Dr., Apt. 1, Birch Run, Mich. 48415

[21] Appl. No.: 430,859

[22] Filed: Apr. 28, 1995

[51] Int. Cl.⁶ .................................................. G05G 5/06
[52] U.S. Cl. .................. 74/512; 74/542; 74/575; 74/529
[58] Field of Search .................. 74/512, 513, 522, 74/525, 529, 542, 560, 561, 562, 575

[56] References Cited

U.S. PATENT DOCUMENTS

| | | |
|---|---|---|
| 2,905,024 | 9/1959 | McCarthy et al. ............. 74/539 |
| 2,915,916 | 12/1959 | Hinsey et al. ............... 74/512 |
| 3,079,809 | 3/1963 | Fender et al. ............... 74/512 |
| 3,315,538 | 4/1967 | Fender ....................... 74/531 |
| 3,511,107 | 5/1970 | Yasiro ....................... 74/512 |
| 3,625,087 | 12/1971 | Flory et al. ................ 74/512 |
| 3,974,713 | 8/1976 | Toohey ....................... 74/512 |
| 4,281,736 | 8/1981 | Lizzio ....................... 74/512 |
| 4,841,798 | 6/1989 | Porter et al. ............... 74/512 |
| 4,872,368 | 10/1989 | Porter ....................... 74/512 |
| 5,272,935 | 12/1993 | Heinemann et al. ............ 74/575 |
| 5,309,786 | 5/1994 | Pare et al. .................. 74/513 |

Primary Examiner—Charles A. Marmor
Assistant Examiner—Chong H. Kim
Attorney, Agent, or Firm—David A. Greenlee

[57] ABSTRACT

A parking brake control device has a torsion lock parking brake actuator which is operated by a foot pad attached to an operator lever. The foot pad is pushed down to set the parking brake. The parking brake is released by pushing down on the depressed foot pad or by a servomotor.

5 Claims, 4 Drawing Sheets

FIG 2
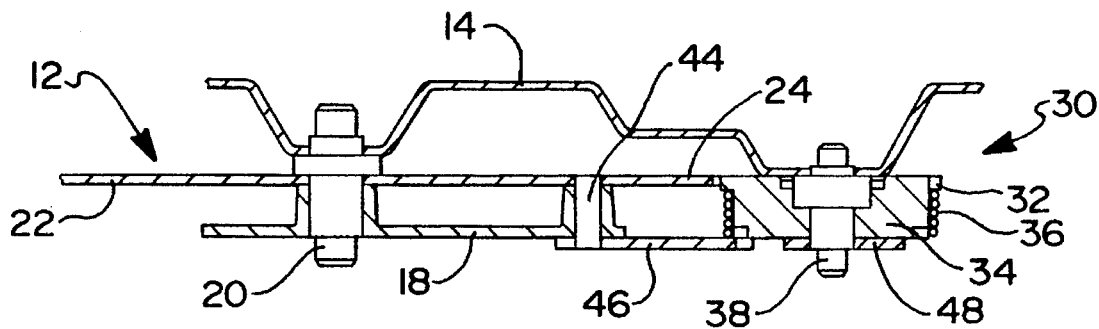
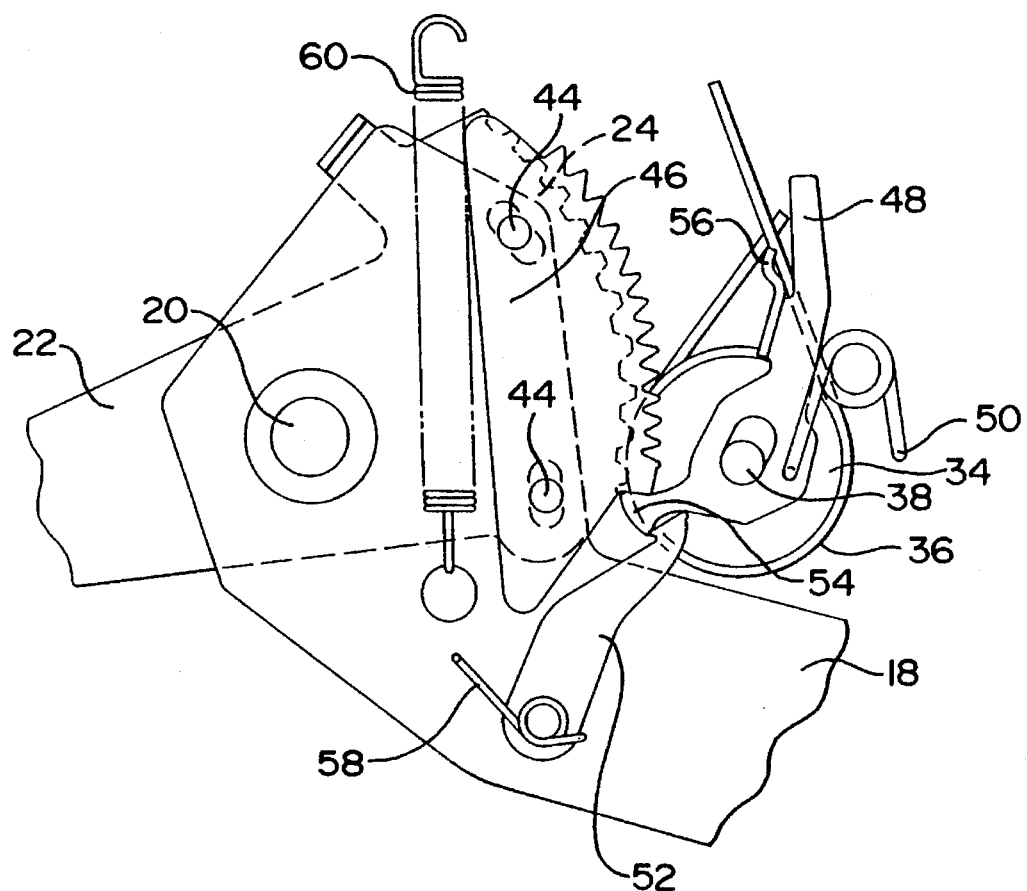
FIG 3

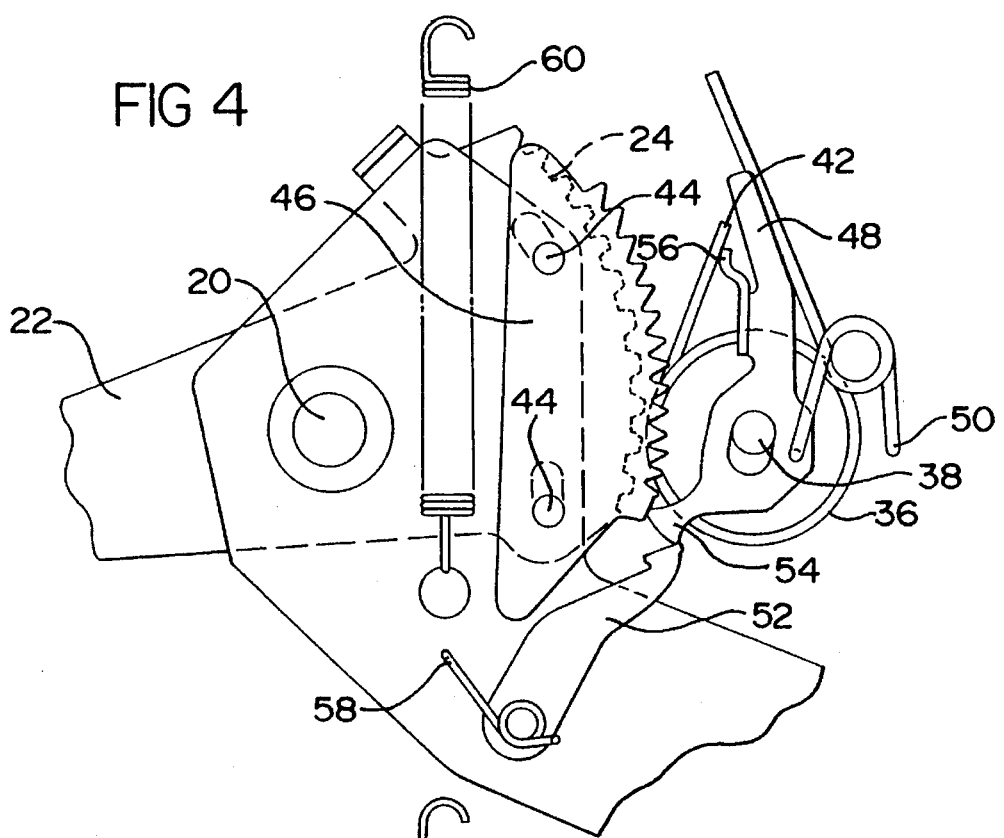
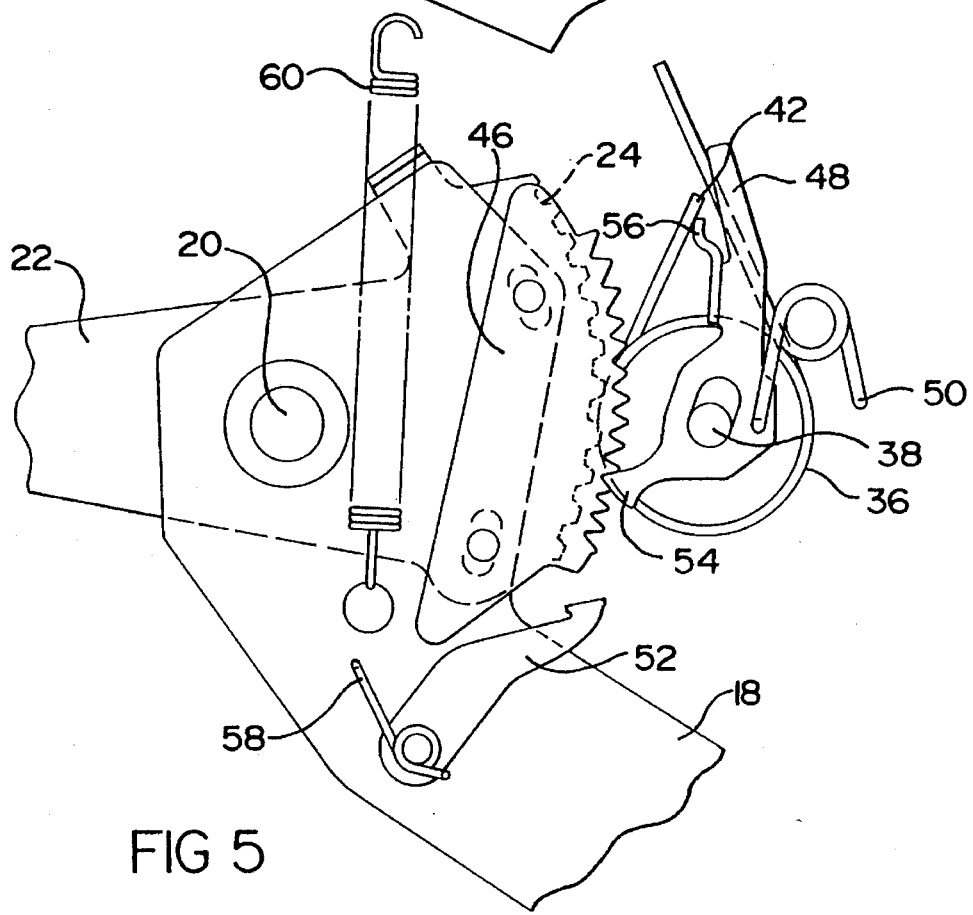

TORSION LOCK PARKING BRAKE ACTUATOR WITH PUSH DOWN RELEASE

BACKGROUND OF THE INVENTION

This invention relates generally to parking brake control devices and more particularly to parking brake control devices that have a torsion lock parking brake actuator.

U.S. Pat. No. 3,315,538 granted to Norman N. Fender Apr. 25, 1967 discloses a parking brake control device that has a torsion lock parking brake actuator. The parking brake actuator has an operator lever that is pivotally mounted on a frame and attached to a cable for actuating the parking brake. The operator lever includes a sector gear that meshes with a pinion gear. The pinion gear is part of a drum that is rotatably mounted on the frame. Rotation of the drum is controlled by a torsion lock comprising a coil spring that is wound snugly around the drum with tabs at each end. One tab is anchored to the frame and the other tab is not attached and free to move. This unattached tab lies in the travel path of a release lever that is also pivotally mounted on the frame.

The parking brakes are set by pressing down on a foot pad attached to the operator lever which rotates the sector gear. The sector gear rotates the pinion gear in a direction that releases the tight grip of the coil spring on the drum so that the sector gear and pinion gears can rotate. After the parking brakes are applied, the operator lever is released and held in the depressed position by the tight grip of the coil spring on the drum which prevents counter rotation of the meshed sector and pinion gears. The parking brakes are released by actuating the release lever, which engages the unattached tab at the free end of the coil spring and unwinds the tight grip of the coil spring on the drum. The parking brakes are then released under the action of the parking brake springs which also return the operator lever to an off position via the cable that actuates the parking brake. The release lever may be manually or power actuated.

The torsion lock parking brake actuator has the well known advantage of holding the operator lever in any position so that the parking brake can be applied with virtually any desired pressure. However, the torsion lock parking brake actuator also has the well known disadvantage of requiring a separate release mechanism which is actuated independently of the operator lever for releasing the parking brake.

There are other types of parking brake actuators that are foot operated and have the capability of releasing the brakes by pushing down on the pedal that is attached to the operator lever. See for example, U.S. Pat. No. 2,905,024; U.S. Pat. 2,915,916; U.S. Pat. No. 3,079,809 and U.S. Pat. 3,511,107.

However, these parking brake actuators do not have the advantage of the torsion lock parking brake actuator, namely, the ability to hold the operator lever in any position so that the parking brake can be applied with virtually any desired pressure.

SUMMARY OF THE INVENTION

The object of this invention is to provide a parking brake control device that has a torsion lock parking brake actuator that does not require a separate, independently operated release mechanism for releasing the parking brake.

A feature of the invention is that the parking brake control device has a torsion lock parking brake actuator that is set by an operator lever and released by manipulating the same operator lever.

Another feature of the invention is that the parking brake control device has a torsion lock parking brake actuator that can be set by depressing a pedal and then released by pushing down on the depressed pedal.

Still another feature of the invention is that the parking brake control device has a torsion lock parking brake actuator that can be set by an operator lever and then released by manipulating the operator lever manually or by a servomotor.

Still another feature of the invention is that the parking brake control device has a torsion lock parking brake actuator that is set by an operator lever that also cocks a release mechanism that is controlled by the operator lever to release the actuator.

Still another feature of the invention is that the parking control device has a torsion lock parking brake actuator that has a transfer lever that is set by a torsion lock and driven by an operator lever that also cocks a release mechanism for the torsion lock when the transfer lever is set.

Yet another feature of the invention is that the operator lever drives the transfer lever via a lost motion connection so that the release mechanism can be cocked by a ratchet.

BRIEF DESCRIPTION OF THE DRAWINGS

The above and other objects, features and advantages of the invention will become more apparent from the following description taken in conjunction with the accompanying drawings wherein like references refer to like parts and wherein:

FIG. 2 is a section taken substantially along the line 2—2 of FIG. 1 looking in the direction of the arrows;

FIG. 3 is an enlargement of a portion of FIG. 1 showing the parting brake actuator in an off position;

FIG. 4 is an enlargement similar to FIG. 3 showing the parking brake actuator in the process of applying the paring brake;

FIG. 5 is an enlargement similar to FIG. 3 showing the parking brake actuator in a set position.

DESCRIPTION OF THE INVENTION

Figure 1:
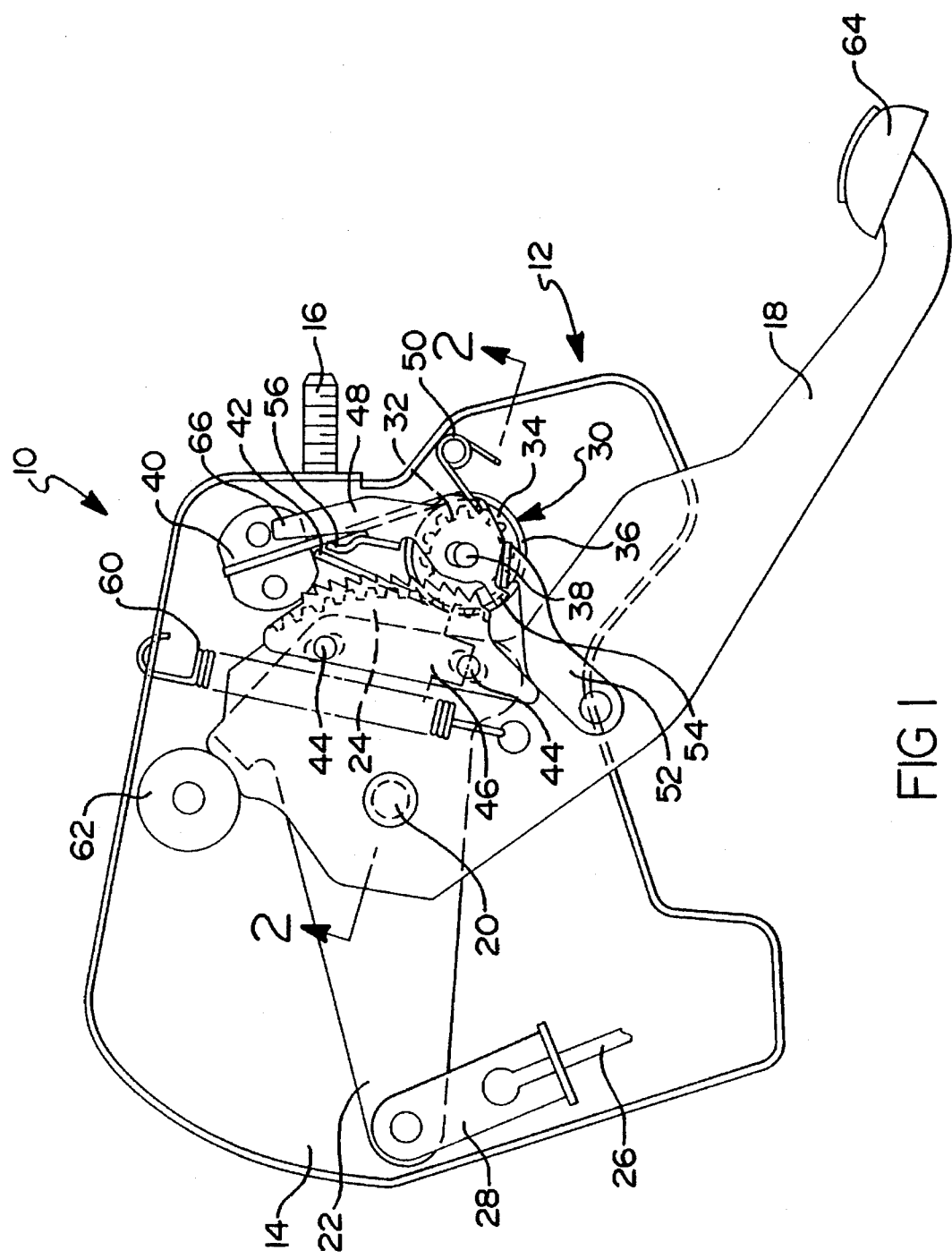
FIG. 1 a side elevational view of a parking brake actuator in accordance with the invention.

Referring now to the drawing, FIG. 1 discloses a parking brake control device 10 that includes a torsion lock parking brake actuator 12 for setting the parking brake (not shown) and for releasing the parking brake after the parking brake has been set. The parking brake actuator comprises a frame 14 that is adapted to be mounted on a support member (not shown) of an automobile body structure in a suitable manner such by bolts 16. The frame 14 is a conventional construction comprising two plates that are attached together to hold several moveable components that are described below. The front plate of the frame 14 is not shown in the drawings in order to show these components more clearly.

An operator lever 18 is pivotally mounted on the frame 14 by a pivot pin 20 that is attached to the frame 14. A transfer lever 22 is also pivotally mounted on the frame 14 by the pivot pin 20. This transfer lever 22 has a sector gear 24 at one end and a cable 26 pivotally attached to the opposite end by a clevis 28.

The cable 26 operates the parking brake (not shown) in a conventional manner. The parking brake mechanism typically includes release springs that act on the cable 26 and the parking brake to release the parking brake. See for example U.S. Pat. No. 3,315,538 discussed above. Thus, the cable 26 normally pulls on the clevis 28 and exerts a counterclockwise moment on the transfer lever 22 as viewed in FIG. 1. The transfer lever 22, however, is held in position by a torsion lock that is indicated generally at 30.

The torsion lock 30 comprises the sector gear 24, a pinion gear 32, a drum 34 and a one-way brake for the drum 34 in the form of a torsion spring 36. The pinion gear 32 is integrally attached to the drum 34 at one end and both are pivotally mounted on the frame 14 by a second pivot pin 38. The pinion gear 32 meshes with the sector gear 24 to position the transfer lever 22. Rotation of the pinion gear 32 is controlled by the drum 34 and the torsion spring 36 which acts as a one-way brake for the drum 34 in a well know manner.

The torsion spring 36 comprises a spiral winding of adjacent coils that is wound in a clockwise direction as viewed in FIG. 1 and two tangential tabs 40, 42 at the opposite ends of the torsion spring 36 that are continuations of the respective end coils. These coils embrace the periphery of the drum 34 snugly. Tab 40 is anchored to the frame 14 by a clamp while tab 42 is detached and free to move. This arrangement results in a one-way brake for the drum 34 which locks the pinion gear 32 and drum against clockwise rotation as viewed in FIG. 1 because any clockwise rotation of the drum 34 wraps the coils of the torsion spring 36 tighter and increases the grip of the coils on the periphery of the drum 34. Thus the torsion spring 36 normally prevents clockwise rotation of the pinion gear 32. This in turn prevents counterclockwise rotation of the transfer lever 22 and counteracts the action of the brake release springs (now shown) that pull on the cable 26.

On the other hand, the arrangement allows rotation of the drum 34 in the counterclockwise direction because such rotation unwraps the coils and releases the grip of the coils on the periphery of the drum 34 so that the pinion gear 32 can be rotated in the counterclockwise direction. Thus the pinion gear 32 rotates when torque is applied to it in the counterclockwise direction.

The coils of the torsion spring 36 can also be unwrapped by moving the unattached tab 42 at the free end of the torsion spring 36 to the left, i.e. counterclockwise from the position shown in FIG. 1. This applies a counterclockwise moment to the coils of the torsion spring 36. As a result the coils unwrap and release their grip on the periphery of the drum 36 so that the pinion gear 32 is free to rotate in the clockwise direction.

The operator lever 18 is drive connected to the transfer lever 22 by a lost motion connection comprising two drive pins 44 that are attached to the operator lever 18 and disposed in slots in the transfer lever 22. This lost motion connection limits the rotation of the operator lever 18 with respect to the transfer lever 22.

The parking brake actuator 12 further comprises a torsion lock release mechanism that is cocked by the operator lever 18 when the parking brake is applied. This release mechanism includes a sector ratchet 46 that is attached the operator lever 18 by the drive pins 44 so as to cooperate with a lock pawl 48, a torsion spring 50 and a recock pawl 52.

The lock pawl 48 is pivotally mounted on the pivot pin 38 of the frame 14 that is used for pivotally mounting the pinion gear 32 and drum 34. This pivot pin 38 is disposed in a slot of the lock pawl so that the lock pawl 38 translates radially as well as pivots on the frame 14. The lock pawl 48 includes a pawl or tooth 54 that is shaped to engage the teeth of the sector ratchet 46 and an arm 56 that is engageable with the detached free end 42 of the torsion spring 48 that locks the pinion gear 32 and drum 34 against rotation in the clockwise direction.

The torsion spring 50 has one end attached to the lock pawl 48 and the other end attached to the frame 14. The respective ends of the torsion spring 50 are attached so that the torsion spring 50 is an over center device that reverses the torque that is applied to the lock pawl 48 by the torsion spring 50 depending upon the position of the lock pawl 48 with respect to the pivot pin 38. When the lock pawl 48 is raised so that the pivot pin 38 engages the bottom of the slot in the lock pawl 48 as shown in FIGS. 1 and 3, the torsion spring 50 applies a counterclockwise moment to the lock pawl 48. However, when the lock pawl is pulled down or lowered so that the pivot pin 38 engages the top of the slot in the lock pawl 48 as shown in FIG. 4, the torsion spring 50 applies a clockwise torque to the lock pawl 48.

The recock pawl 52 is pivotally mounted on the operator lever 18 by a pivot pin that also supports a torsion spring 58. One end of the torsion spring 58 is attached to the operator lever 18 and the other end engages the recock pawl 52 so that the torsion spring 58 biases the recock pawl 52 counterclockwise as viewed in FIGS. 1 and 3. The recock pawl 52 is thus adapted to engage the lock pawl 48 and counteract the torsion spring 50 when the lock pawl 48 is raised as shown in FIGS. 1 and 3.

The parking brake actuator 12 also includes a return spring 60 that is attached to the operator lever 18 and the frame 14 for biasing the operator lever 18 toward the off position shown in FIG. 1; and a rubber bumper or stopper 62 that is attached to the frame 14. The stopper 62 engages the operator lever 18 when it is released and holds the operator lever 18 in a brake off position against the bias of the return spring 60.

Operation

FIGS. 1, 2 and 3 show the parking brake actuator 12 in the off position where the parking brake is not applied. In order to apply the parking brake, the pedal 64 attached to the end of the operator lever 18 is pushed down or depressed so that the operator lever 18 rotates clockwise as viewed in FIGS. 1 and 3.

As pedal 64 is depressed, operator lever 18 and sector ratchet 46 rotate clockwise with respect to the transfer lever 22 until drive pins 44 move to the lower ends of the slots in the transfer lever 22.

During this initial movement, the recock pawl 52 which is attached to lever 18 also pulls lock pawl 48 down on the pivot pin 38 until the pivot pin 38 engages the upper end of the slot in lock pawl 48. The pawl spring 50 then applies a clockwise moment to the lock pawl 48 so that the lock pawl 48 is biased against the sector ratchet 46 that is attached to the operator lever 18 as shown in FIG. 4.

Continued depression of the pedal 64 causes the transfer lever 22 and sector gear 24 to rotate clockwise on the pivot pin 20 with the operator lever 18. Clockwise rotation of the transfer lever 22 applies the parking brake via the cable 26 and clevis 28 shown in FIG. 1. The lock pawl 48 simultaneously ratchets on the ratchet sector 46 under the bias of the pawl spring 50.

During this time, the pinion gear 32 that meshes with the sector gear 24 rotates counterclockwise, such rotation being permitted by the one-way braking action of the torsion spring 36 as explained above.

When the parking brake is applied with the desired pressure, the pedal 64 is released, causing two reactions. The parking brake cable 26 applies torque to the transfer lever 22 and sector gear 24 in a counterclockwise direction and attempts to rotate the pinion gear 32 clockwise so that the torsion spring 36 locks the drum 34 and pinion 32 against clockwise rotation as explained above. This sets the parking brake.

At the same time, return spring 60 rotates operator lever 18 and sector ratchet 46 counterclockwise while sector ratchet 46, engaged with lock pawl 48, forces lock pawl 48 to shift up on pivot pin 38 until pivot pin 38 engages the lower end of the slot in the lock pawl 48. This upward shift reverses the moment of the pawl spring 50 on the lock pawl 48 from clockwise to counterclockwise. The lock pawl 48, however, is held in engagement with the sector ratchet 46 by the geometry of the sector ratchet 46, specifically the ratchet tooth profile. This upward shift cocks the torsion lock release mechanism and the parking brake can then be released simply by pushing down on the depressed foot pedal 64.

Figure 6:
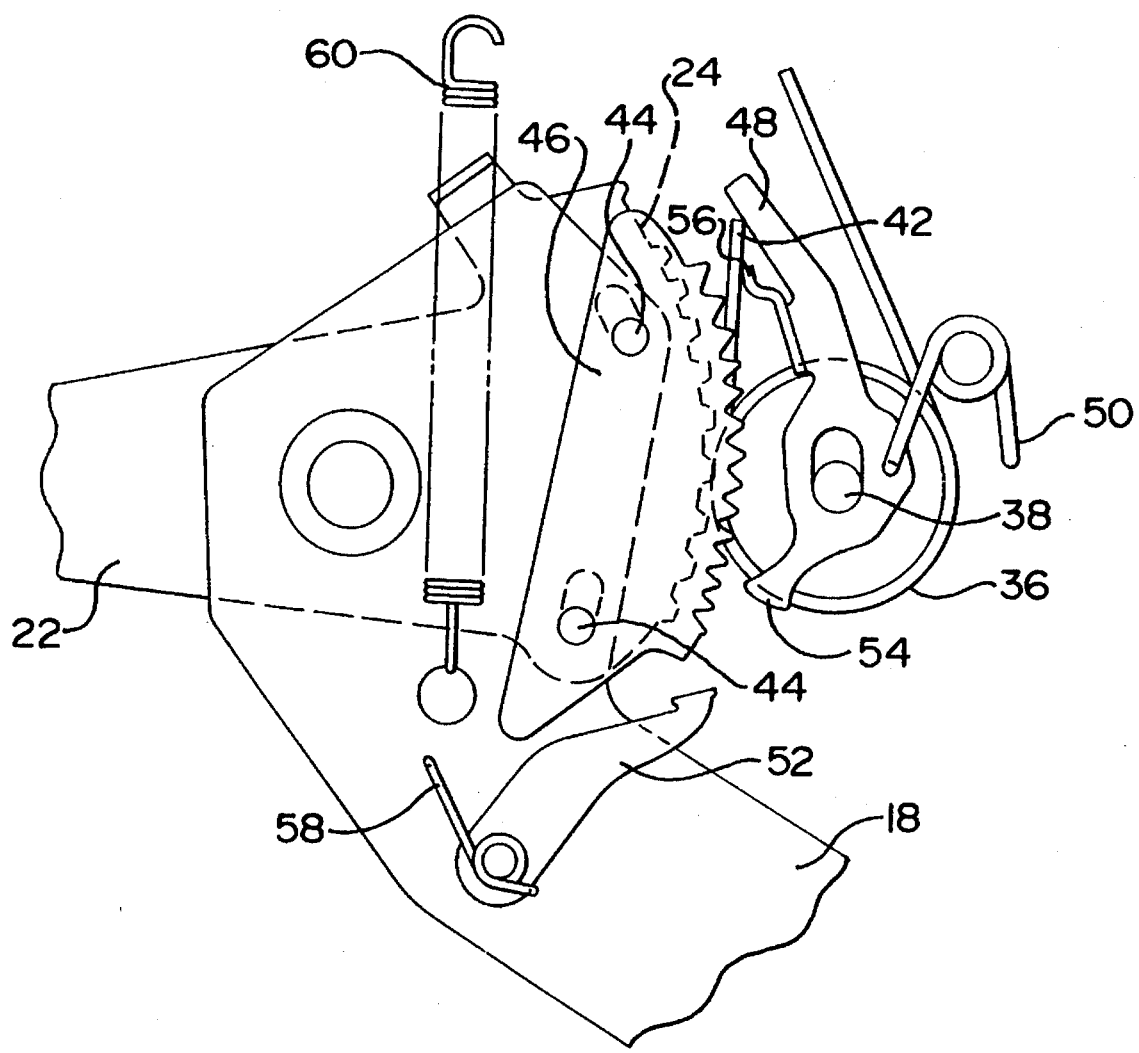
FIG. 6 an enlargement similar to FIG. 3 showing the parking brake actuator in the process of releasing the parking brake.

The position of the parts with the parking brake set and the torque release mechanism cocked to release the parking brake is shown in FIG. 5. When the depressed foot pedal 64 is pushed down to release the parking brake, the operator lever 18 and sector ratchet 46 are rotated clockwise from the set position shown in FIG. 5 to the release position shown in FIG. 6. Interference between lock pawl 48 and sector ratchet 46 is eliminated, and the counterclockwise moment on the lock pawl 58 from the pawl spring 50 disengages the lock pawl 48 from the ratchet sector 46 and rotates the lock pawl 48 counterclockwise. As the lock pawl 48 rotates counterclockwise, the arm 56 of the lock pawl 48 engages and moves the tab 42 at the free end of the torsion spring 36 counterclockwise causing the torsion spring 36 to unwind and release the drum 34 and pinion gear 32 so that the pinion gear 32 can rotate clockwise. Once the torsion lock is released the sector gear 24 and transfer lever 22 are then returned to the brake off position shown in FIGS. 1, 2, and 3 in a counterclockwise rotation produced by the pull of the parking brake cable 26.

At the same time the operator lever 18 and sector ratchet 46 are returned to the brake off position in a counterclockwise rotation by the return spring 60. As the operator lever 18 returns to the brake off position, the recock pawl 52 engages and interlocks with the lock pawl 48 and rotates the lock pawl 48 clockwise into engagement with the sector ratchet 46 as shown in FIGS. 1, 2 and 3.

The parking brake actuator 12 is now ready to apply the parking brake when the pedal 64 is depressed.

The lost motion drive connection between the operator lever 18 and the transfer lever 22 is required because torsion spring 36 and lock pawl 48 do not always lock at the same time. This lost motion drive connection allows the torsion spring 36 to lock-up the pinion gear 32 and set the parking brake via the transfer lever 22 while the lock pawl 48 continues movement from force supplied by return spring 60 via the sector ratchet 46 until stopping on the pivot pin 38 to cock the torsion lock release mechanism as shown in FIG. 5.

When the transfer lever 22 is set and the torsion lock release mechanism is cocked as shown in FIG. 5, the tooth load which is created at lock pawl 48 and sector ratchet 46 interface by return spring 60 is small. Consequently the parking brake can also be released by use of a servomotor, such as a conventional vacuum canister or electric motor operatively connected to arm 66 of the lock pawl 48. See for instance servo motor 154 illustrated in FIGS. 1, 2, 5 and 6 of U.S. Pat. No. 3,315,538 discussed above. This provides a second way to release the parking brake which is particularly well suited for an automatic release feature in a luxury automobile.

While the parking brake actuator 12 has been described in connection with a parking brake, it should be understood that the parking brake actuator 12 can operate several parking brakes, for instance a parking brake at each wheel of an automotive vehicle. In other words, the invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A torsion lock parking brake actuator comprising:
    a frame that is adapted to be mounted on a support member,
    a transfer lever pivotally mounted on the frame for applying a parking brake responsive to rotation of the transfer lever,
    an operator lever pivotally mounted on the frame for rotating the transfer lever,
    a torsion lock operatively connected to the transfer lever for locking the transfer lever in a brake set position where the parking brakes are applied, and
    a torsion lock release mechanism operatively connected to the operator lever that engages the torsion lock when the transfer lever is in the brake set position to release the transfer lever responsive to rotation of the operator lever, said torsion lock release mechanism including
    a sector ratchet that is attached the operator lever, and
    a lock pawl that is pivotally mounted on the frame that includes
        a tooth that is shaped to engage the teeth of the sector ratchet, and
        an arm that engages the torsion lock to release the transfer lever.

2. The parking brake actuator as defined in claim 1, wherein the lock pawl is mounted on the frame so that it translates radially as well as pivots on the frame.

3. The parking brake actuator as defined in claim 1, wherein the torque release mechanism further includes a spring having one end attached to the lock pawl and the other end attached to the frame so that the spring is an over center device that reverses the torque that is applied to the lock pawl by the spring responsive to the position of the lock pawl with respect to the frame.

4. The parking brake actuator as defined in claim 3 wherein the torque release mechanism further includes a recock pawl pivotally mounted on the operator lever for repositioning the lock pawl to reverse the torque that is applied by the spring.

5. A torsion lock parking brake actuator comprising:
    a frame that is adapted to be mounted on a support member, an operator lever and a transfer lever pivotally mounted on the frame, the operator lever and the transfer lever being drive connected by a lost motion connection that limits the rotation of the operator lever with respect to the transfer lever, the transfer lever having a sector gear and being adapted for applying a parking brake by means of a cable, a torsion lock for maintaining the position of the transfer lever, the torsion lock including the sector gear, a pinion gear, a drum and a one-way brake for the drum in the form of a torsion spring, the pinion gear and the drum being attached to each other and pivotally mounted on the frame so that the pinion gear meshes with the sector gear, the torsion spring having a spiral winding of adjacent coils that embrace the periphery of the drum, a tab at one end that is anchored to the frame and a second tab at the other end that is free to move, and a torsion lock release mechanism that includes a sector ratchet that is attached to the operator lever, a lock pawl, a second spring and a recock pawl, the lock pawl being pivotally mounted on the frame so that the lock pawl translates radially as well as pivots on the frame, the lock pawl being engageable with teeth of the sector ratchet and having an arm that is engageable with the second tab of the torsion spring, the second spring having one end attached to the lock pawl and the other end attached to the frame so that the second spring is an over center device that reverses the torque that is applied to the lock pawl by the second spring responsive to the position of the lock pawl with respect to the frame, the recock pawl being pivotally mounted on the operator lever and operatively connected to a third spring that biases the recock pawl toward engagement with the lock pawl, and a return spring that is attached to the operator lever and the frame for biasing the operator lever toward an off position.

* * * * *